(12) United States Patent
Guéziec et al.

(10) Patent No.: US 8,725,396 B2
(45) Date of Patent: May 13, 2014

(54) SYSTEM FOR PROVIDING TRAFFIC DATA AND DRIVING EFFICIENCY DATA

(75) Inventors: André Guéziec, Sunnyvale, CA (US); Romain Faure, Antony (FR); Damien Poulain, Capbreton (FR)

(73) Assignee: Pelmorex Canada Inc., Ontario (CA)

( * ) Notice: Subject to any disclaimer, the term of this patent is extended or adjusted under 35 U.S.C. 154(b) by 0 days.

(21) Appl. No.: 13/475,502

(22) Filed: May 18, 2012

(65) Prior Publication Data

US 2012/0296559 A1 Nov. 22, 2012

Related U.S. Application Data

(60) Provisional application No. 61/487,425, filed on May 18, 2011.

(51) Int. Cl.
*G06F 19/00* (2011.01)
*G08G 1/00* (2006.01)
*G08G 1/0968* (2006.01)

(52) U.S. Cl.
USPC .......................................... 701/117; 701/118

(58) Field of Classification Search
CPC ..... G08G 1/0141; G08G 1/0968; G08G 1/00; G01C 21/3415; G01C 21/3492; G01C 21/3691; G06F 19/00
USPC ................... 701/117, 118, 119, 400
See application file for complete search history.

(56) References Cited

U.S. PATENT DOCUMENTS

| | | |
|---|---|---|
| 4,734,863 A | 3/1988 | Honey et al. |
| 4,788,645 A | 11/1988 | Zavoli et al. |
| 4,792,803 A | 12/1988 | Madnick et al. |
| 4,796,191 A | 1/1989 | Honey et al. |
| 4,878,170 A | 10/1989 | Zeevi |
| 4,914,605 A | 4/1990 | Loughmiller, Jr. et al. |
| 4,926,343 A | 5/1990 | Tsuruta et al. |

(Continued)

FOREIGN PATENT DOCUMENTS

| | | |
|---|---|---|
| DE | 19856704 | 6/2001 |
| EP | 0 749 103 | 12/1996 |

(Continued)

OTHER PUBLICATIONS

Acura Debuts AcuraLink™ Satellite-Linked Communication System with Industry's First Standard Real Time Traffic Feature at New York International Auto Show, 2004, 4 pages.

(Continued)

*Primary Examiner* — Fadey Jabr
*Assistant Examiner* — Angelina Shudy
(74) *Attorney, Agent, or Firm* — Lewis Roca Rothgerber LLP

(57) ABSTRACT

Current and predicted traffic information is provided from incident data, traffic flow data, and media related to traffic received from multiple sources. The crowd sourced data may be provided passively by applications on remote mobile devices or actively by users operating the remote mobile devices. An application on a mobile device may receive the multiple data types, aggregate and validate the data, and provides traffic information for a user. The traffic information may relate to the current position and route of the user or a future route. The present technology may also provide driving efficiency information such as fuel consumption data, carbon footprint data, and a driving rating for a user associated with a vehicle.

12 Claims, 9 Drawing Sheets

(56) References Cited

U.S. PATENT DOCUMENTS

| | | |
|---|---|---|
| 5,068,656 A | 11/1991 | Sutherland |
| 5,095,532 A | 3/1992 | Mardus |
| 5,126,941 A | 6/1992 | Gurmu et al. |
| 5,164,904 A | 11/1992 | Sumner |
| 5,173,691 A | 12/1992 | Sumner |
| 5,182,555 A | 1/1993 | Sumner |
| 5,220,507 A | 6/1993 | Kirson |
| 5,247,439 A | 9/1993 | Gurmu et al. |
| 5,262,775 A | 11/1993 | Tamai et al. |
| 5,276,785 A | 1/1994 | Mackinlay et al. |
| 5,283,575 A | 2/1994 | Kao et al. |
| 5,291,412 A | 3/1994 | Tamai et al. |
| 5,291,413 A | 3/1994 | Tamai et al. |
| 5,291,414 A | 3/1994 | Tamai et al. |
| 5,297,028 A | 3/1994 | Ishikawa |
| 5,297,049 A | 3/1994 | Gurmu et al. |
| 5,303,159 A | 4/1994 | Tamai et al. |
| 5,311,195 A | 5/1994 | Mathis et al. |
| 5,311,434 A | 5/1994 | Tamai |
| 5,339,246 A | 8/1994 | Kao |
| 5,343,400 A | 8/1994 | Ishikawa |
| 5,345,382 A | 9/1994 | Kao |
| 5,359,529 A | 10/1994 | Snider |
| 5,374,933 A | 12/1994 | Kao |
| 5,377,113 A | 12/1994 | Shibazaki et al. |
| 5,390,123 A | 2/1995 | Ishikawa |
| 5,394,333 A | 2/1995 | Kao |
| 5,402,120 A | 3/1995 | Fujii et al. |
| 5,414,630 A | 5/1995 | Oshizawa et al. |
| 5,428,545 A | 6/1995 | Maegawa et al. |
| 5,430,655 A | 7/1995 | Adachi |
| 5,440,484 A | 8/1995 | Kao |
| 5,465,079 A | 11/1995 | Bouchard et al. |
| 5,477,220 A | 12/1995 | Ishikawa |
| 5,485,161 A | 1/1996 | Vaughn |
| 5,488,559 A | 1/1996 | Seymour |
| 5,499,182 A | 3/1996 | Ousborne |
| 5,508,931 A | 4/1996 | Snider |
| 5,515,283 A | 5/1996 | Desai |
| 5,515,284 A | 5/1996 | Abe |
| 5,539,645 A | 7/1996 | Mandhyan et al. |
| 5,546,107 A | 8/1996 | Deretsky et al. |
| 5,548,822 A | 8/1996 | Yogo |
| 5,550,538 A | 8/1996 | Fujii et al. |
| 5,554,845 A | 9/1996 | Russell |
| 5,583,972 A | 12/1996 | Miller |
| 5,608,635 A | 3/1997 | Tamai |
| 5,610,821 A | 3/1997 | Gazis et al. |
| 5,689,252 A | 11/1997 | Ayanoglu et al. |
| 5,694,534 A | 12/1997 | White, Jr. et al. |
| 5,699,056 A | 12/1997 | Yoshida |
| 5,706,503 A | 1/1998 | Poppen et al. |
| 5,712,788 A | 1/1998 | Liaw et al. |
| 5,729,458 A | 3/1998 | Poppen |
| 5,731,978 A | 3/1998 | Tamai et al. |
| 5,742,922 A | 4/1998 | Kim |
| 5,751,245 A | 5/1998 | Janky et al. |
| 5,751,246 A | 5/1998 | Hertel |
| 5,757,359 A | 5/1998 | Morimoto et al. |
| 5,774,827 A | 6/1998 | Smith et al. |
| 5,818,356 A | 10/1998 | Schuessler |
| 5,822,712 A | 10/1998 | Olsson |
| 5,845,227 A | 12/1998 | Peterson |
| 5,850,190 A | 12/1998 | Wicks et al. |
| 5,862,244 A | 1/1999 | Kleiner et al. |
| 5,862,509 A | 1/1999 | Desai et al. |
| 5,864,305 A | 1/1999 | Rosenquist |
| 5,867,110 A | 2/1999 | Naito et al. |
| 5,893,081 A | 4/1999 | Poppen |
| 5,893,898 A | 4/1999 | Tanimoto |
| 5,898,390 A | 4/1999 | Oshizawa et al. |
| 5,902,350 A | 5/1999 | Tamai et al. |
| 5,904,728 A | 5/1999 | Tamai et al. |
| 5,908,464 A | 6/1999 | Kishigami et al. |
| 5,910,177 A | 6/1999 | Zuber |
| 5,911,773 A | 6/1999 | Mutsuga et al. |
| 5,912,635 A | 6/1999 | Oshizawa et al. |
| 5,916,299 A | 6/1999 | Poppen |
| 5,922,042 A | 7/1999 | Sekine et al. |
| 5,928,307 A | 7/1999 | Oshizawa et al. |
| 5,931,888 A | 8/1999 | Hiyokawa |
| 5,933,100 A | 8/1999 | Golding |
| 5,938,720 A | 8/1999 | Tamai |
| 5,948,043 A | 9/1999 | Mathis et al. |
| 5,978,730 A | 11/1999 | Poppen et al. |
| 5,982,298 A | 11/1999 | Lappenbusch et al. |
| 5,987,381 A | 11/1999 | Oshizawa et al. |
| 5,991,687 A | 11/1999 | Hale et al. |
| 5,999,882 A | 12/1999 | Simpson et al. |
| 6,009,374 A | 12/1999 | Urahashi |
| 6,011,494 A | 1/2000 | Watanabe et al. |
| 6,016,485 A | 1/2000 | Amakawa et al. |
| 6,021,406 A | 2/2000 | Kuznetsov |
| 6,038,509 A | 3/2000 | Poppen et al. |
| 6,058,390 A | 5/2000 | Liaw et al. |
| 6,064,970 A | 5/2000 | McMillan et al. |
| 6,091,359 A | 7/2000 | Geier |
| 6,091,956 A | 7/2000 | Hollenberg |
| 6,097,399 A | 8/2000 | Bhatt et al. |
| 6,111,521 A | 8/2000 | Mulder et al. |
| 6,144,919 A | 11/2000 | Ceylan et al. |
| 6,147,626 A | 11/2000 | Sakakibara |
| 6,150,961 A | 11/2000 | Alewine et al. |
| 6,161,092 A | 12/2000 | Latshaw et al. |
| 6,169,552 B1 | 1/2001 | Endo et al. |
| 6,188,956 B1 | 2/2001 | Walters |
| 6,209,026 B1 | 3/2001 | Ran et al. |
| 6,222,485 B1 | 4/2001 | Walters et al. |
| 6,236,933 B1 | 5/2001 | Lang |
| 6,253,146 B1 | 6/2001 | Hanson et al. |
| 6,253,154 B1 | 6/2001 | Oshizawa et al. |
| 6,256,577 B1 | 7/2001 | Graunke |
| 6,259,987 B1 | 7/2001 | Ceylan et al. |
| 6,282,486 B1 | 8/2001 | Bates et al. |
| 6,282,496 B1 | 8/2001 | Chowdhary |
| 6,292,745 B1 | 9/2001 | Robare et al. |
| 6,295,492 B1 | 9/2001 | Lang et al. |
| 6,297,748 B1 | 10/2001 | Lappenbusch et al. |
| 6,298,305 B1 | 10/2001 | Kadaba et al. |
| 6,317,685 B1 | 11/2001 | Kozak et al. |
| 6,317,686 B1 | 11/2001 | Ran |
| 6,335,765 B1 | 1/2002 | Daly et al. |
| 6,353,795 B1 | 3/2002 | Ranjan |
| 6,356,836 B1 | 3/2002 | Adolph |
| 6,360,165 B1 | 3/2002 | Chowdhary |
| 6,362,778 B2 | 3/2002 | Neher |
| 6,415,291 B2 | 7/2002 | Bouve et al. |
| 6,424,910 B1 | 7/2002 | Ohler et al. |
| 6,456,931 B1 | 9/2002 | Polidi et al. |
| 6,456,935 B1 | 9/2002 | Ng |
| 6,463,400 B1 | 10/2002 | Barkley-Yeung |
| 6,466,862 B1 | 10/2002 | DeKock et al. |
| 6,470,268 B1 | 10/2002 | Ashcraft et al. |
| 6,473,000 B1 | 10/2002 | Secreet et al. |
| 6,480,783 B1 | 11/2002 | Myr |
| 6,504,541 B1 | 1/2003 | Liu et al. |
| 6,529,143 B2 | 3/2003 | Mikkola et al. |
| 6,532,304 B1 | 3/2003 | Liu et al. |
| 6,539,302 B1 | 3/2003 | Bender et al. |
| 6,542,814 B2 | 4/2003 | Polidi et al. |
| 6,552,656 B2 | 4/2003 | Polidi et al. |
| 6,556,905 B1 | 4/2003 | Mittelsteadt et al. |
| 6,559,865 B1 | 5/2003 | Angwin |
| 6,574,548 B2 | 6/2003 | DeKock et al. |
| 6,584,400 B2 | 6/2003 | Beardsworth |
| 6,594,576 B2 | 7/2003 | Fan et al. |
| 6,598,016 B1 | 7/2003 | Zavoli et al. |
| 6,600,994 B1 | 7/2003 | Polidi |
| 6,603,405 B2 | 8/2003 | Smith |
| 6,622,086 B2 | 9/2003 | Polidi |
| 6,650,997 B2 | 11/2003 | Funk |
| 6,654,681 B1 * | 11/2003 | Kiendl et al. ............... 701/117 |
| 6,675,085 B2 | 1/2004 | Straub |
| 6,681,176 B2 | 1/2004 | Funk et al. |

(56) References Cited

U.S. PATENT DOCUMENTS

| | | |
|---|---|---|
| 6,687,615 B1 | 2/2004 | Krull et al. |
| 6,700,503 B2 | 3/2004 | Masar et al. |
| 6,710,774 B1 | 3/2004 | Kawasaki et al. |
| 6,720,889 B2 | 4/2004 | Yamaki et al. |
| 6,728,605 B2 | 4/2004 | Lash et al. |
| 6,728,628 B2 | 4/2004 | Peterson |
| 6,731,940 B1 | 5/2004 | Nagendran |
| 6,735,516 B1 | 5/2004 | Manson |
| 6,754,833 B1 | 6/2004 | Black et al. |
| 6,785,606 B2 | 8/2004 | DeKock et al. |
| 6,791,472 B1 | 9/2004 | Hoffberg |
| 6,807,483 B1 | 10/2004 | Chao et al. |
| 6,845,316 B2 | 1/2005 | Yates |
| 6,862,524 B1 | 3/2005 | Nagda et al. |
| RE38,724 E | 4/2005 | Peterson |
| 6,885,937 B1 | 4/2005 | Sunranyi |
| 6,901,330 B1 | 5/2005 | Krull et al. |
| 6,914,541 B1 | 7/2005 | Zierden |
| 6,922,629 B2 | 7/2005 | Yoshikawa et al. |
| 6,931,309 B2 | 8/2005 | Phelan et al. |
| 6,952,643 B2 | 10/2005 | Matsuoka et al. |
| 6,965,665 B2 | 11/2005 | Fan et al. |
| 6,983,204 B2 | 1/2006 | Knutson |
| 6,987,964 B2 | 1/2006 | Obradovich et al. |
| 6,989,765 B2 | 1/2006 | Gueziec |
| 6,999,873 B1 | 2/2006 | Krull et al. |
| 7,010,583 B1 | 3/2006 | Aizono et al. |
| 7,062,378 B2 | 6/2006 | Krull et al. |
| 7,069,143 B2 | 6/2006 | Peterson |
| 7,103,854 B2 | 9/2006 | Fuchs et al. |
| 7,161,497 B2 | 1/2007 | Gueziec |
| 7,221,287 B2 | 5/2007 | Gueziec |
| 7,356,392 B2 | 4/2008 | Hubbard et al. |
| 7,375,649 B2 | 5/2008 | Gueziec |
| 7,486,201 B2 | 2/2009 | Kelly et al. |
| 7,508,321 B2 * | 3/2009 | Gueziec et al. ............. 340/905 |
| 7,511,634 B2 * | 3/2009 | Stehle et al. .................. 340/905 |
| 7,557,730 B2 | 7/2009 | Gueziec |
| 7,558,674 B1 | 7/2009 | Neiley et al. |
| 7,610,145 B2 | 10/2009 | Kantarjiev et al. |
| 7,634,352 B2 | 12/2009 | Soulchin et al. |
| 7,702,452 B2 | 4/2010 | Kantarjiev et al. |
| 7,792,642 B1 | 9/2010 | Neiley et al. |
| 7,880,642 B2 | 2/2011 | Gueziec |
| 8,103,443 B2 | 1/2012 | Kantarjiev et al. |
| 8,280,355 B1 * | 10/2012 | Jones ......................... 455/414.1 |
| 8,358,222 B2 | 1/2013 | Gueziec |
| 2001/0014848 A1 | 8/2001 | Walgers et al. |
| 2001/0018628 A1 | 8/2001 | Jenkins et al. |
| 2001/0026276 A1 | 10/2001 | Sakamoto et al. |
| 2001/0033225 A1 | 10/2001 | Razavi et al. |
| 2001/0047242 A1 | 11/2001 | Ohta |
| 2002/0042819 A1 | 4/2002 | Reichert et al. |
| 2002/0077748 A1 | 6/2002 | Nakano |
| 2002/0152020 A1 | 10/2002 | Seibel |
| 2002/0175868 A1 | 11/2002 | Reichert |
| 2003/0046158 A1 | 3/2003 | Kratky |
| 2003/0109985 A1 * | 6/2003 | Kotzin ......................... 701/209 |
| 2003/0135304 A1 | 7/2003 | Sroub et al. |
| 2003/0182052 A1 | 9/2003 | DeLorme et al. |
| 2004/0034464 A1 * | 2/2004 | Yoshikawa et al. ........... 701/117 |
| 2004/0046759 A1 | 3/2004 | Soulchin et al. |
| 2004/0080624 A1 | 4/2004 | Yuen |
| 2004/0107288 A1 | 6/2004 | Menninger et al. |
| 2004/0143385 A1 | 7/2004 | Smyth et al. |
| 2004/0249568 A1 | 12/2004 | Endo et al. |
| 2005/0021225 A1 | 1/2005 | Kantarjiev et al. |
| 2005/0143902 A1 | 6/2005 | Soulchin et al. |
| 2005/0154505 A1 | 7/2005 | Nakamura et al. |
| 2006/0122846 A1 | 6/2006 | Burr et al. |
| 2006/0143959 A1 | 7/2006 | Stehle et al. |
| 2006/0145892 A1 | 7/2006 | Gueziec |
| 2006/0158330 A1 | 7/2006 | Gueziec |
| 2006/0238521 A1 | 10/2006 | Westerman et al. |
| 2006/0284766 A1 | 12/2006 | Gruchala et al. |
| 2007/0013551 A1 | 1/2007 | Gueziec |
| 2007/0038362 A1 * | 2/2007 | Gueziec ....................... 701/117 |
| 2007/0060384 A1 | 3/2007 | Dohta |
| 2007/0066394 A1 | 3/2007 | Ikeda et al. |
| 2007/0197217 A1 | 8/2007 | Sutardja |
| 2007/0208495 A1 * | 9/2007 | Chapman et al. ............. 701/117 |
| 2007/0208496 A1 * | 9/2007 | Downs et al. .................. 701/117 |
| 2007/0211026 A1 | 9/2007 | Ohta |
| 2007/0211027 A1 | 9/2007 | Ohta |
| 2007/0222750 A1 | 9/2007 | Ohta |
| 2007/0247291 A1 * | 10/2007 | Masuda et al. ................. 340/439 |
| 2007/0265766 A1 | 11/2007 | Jung et al. |
| 2008/0071465 A1 | 3/2008 | Chapman et al. |
| 2008/0084385 A1 | 4/2008 | Ranta et al. |
| 2008/0133120 A1 | 6/2008 | Romanick |
| 2008/0255754 A1 | 10/2008 | Pinto |
| 2008/0297488 A1 | 12/2008 | Operowsky et al. |
| 2009/0005965 A1 | 1/2009 | Forstall et al. |
| 2009/0061971 A1 | 3/2009 | Weitzner et al. |
| 2009/0066495 A1 | 3/2009 | Newhouse et al. |
| 2009/0082950 A1 * | 3/2009 | Vorona .......................... 701/119 |
| 2009/0112465 A1 | 4/2009 | Weiss et al. |
| 2009/0118017 A1 | 5/2009 | Perlman et al. |
| 2009/0118996 A1 | 5/2009 | Kantarjiev et al. |
| 2009/0189979 A1 | 7/2009 | Smyth |
| 2009/0192702 A1 * | 7/2009 | Bourne ......................... 701/200 |
| 2010/0094531 A1 | 4/2010 | Macleod |
| 2010/0100307 A1 | 4/2010 | Kim |
| 2010/0145569 A1 | 6/2010 | Bourque et al. |
| 2010/0145608 A1 | 6/2010 | Kurtti et al. |
| 2010/0175006 A1 | 7/2010 | Li |
| 2010/0198453 A1 | 8/2010 | Dorogusker et al. |
| 2010/0225643 A1 | 9/2010 | Gueziec |
| 2010/0305839 A1 * | 12/2010 | Wenzel ......................... 701/117 |
| 2010/0312462 A1 | 12/2010 | Gueziec |
| 2010/0333045 A1 | 12/2010 | Gueziec |
| 2011/0037619 A1 * | 2/2011 | Ginsberg et al. ............. 340/910 |
| 2011/0106427 A1 | 5/2011 | Kim et al. |
| 2011/0304447 A1 * | 12/2011 | Marumoto ..................... 340/438 |
| 2012/0072096 A1 * | 3/2012 | Chapman et al. ............. 701/118 |
| 2012/0123667 A1 * | 5/2012 | Gueziec ....................... 701/119 |
| 2012/0150422 A1 | 6/2012 | Kantarjiev et al. |
| 2012/0150425 A1 * | 6/2012 | Chapman et al. ............. 701/119 |
| 2012/0158275 A1 * | 6/2012 | Huang et al. ................. 701/119 |
| 2012/0290202 A1 | 11/2012 | Gueziec |
| 2012/0290204 A1 | 11/2012 | Gueziec |
| 2013/0033385 A1 | 2/2013 | Gueziec |
| 2013/0211701 A1 * | 8/2013 | Baker et al. ................... 701/120 |

FOREIGN PATENT DOCUMENTS

| | | |
|---|---|---|
| EP | 0 987 665 | 3/2000 |
| EP | 1 006 367 | 6/2000 |
| GB | 2 400 293 | 10/2004 |
| JP | 05-313578 | 11/1993 |
| JP | 08-77485 | 3/1996 |
| JP | 10-261188 | 9/1998 |
| JP | 10-281782 | 10/1998 |
| JP | 10-293533 | 11/1998 |
| JP | 2000-055675 | 2/2000 |
| JP | 2000-113387 | 4/2000 |
| JP | 2001-330451 | 11/2001 |
| WO | WO 98/23018 | 5/1998 |
| WO | WO 00/50917 | 8/2000 |
| WO | WO 01/88480 | 11/2001 |
| WO | WO 02/77921 | 10/2002 |
| WO | WO 03/014671 | 2/2003 |
| WO | WO 2005/076031 | 8/2005 |
| WO | WO 2010/073053 | 7/2010 |

OTHER PUBLICATIONS

Adib Kanafani, "Towards a Technology Assessment of Highway Navigation and Route Guidance," Program on Advanced Technology for the Highway, Institute of Transportation Studies, University of California, Berkeley, Dec. 1987, PATH Working Paper UCB-ITS-PWP-87-6.

(56) References Cited

OTHER PUBLICATIONS

Answer, Affirmative Defenses, and Counterclaims by Defendant Westwood One, Inc., to Plaintiff Triangle Software, LLC's Complaint for Patent Infringement.
Answer and Counterclaims of TomTom, Inc. to Plaintiff Triangle Software, LLC's Complaint for Patent Infringement.
Amended Answer and Counterclaims of TomTom, Inc. to Plaintiff Triangle Software, LLC's Complaint for Patent Infringement.
Attachment A of Garmin's Preliminary Invalidity Contentions and Certificate of Service filed May 16, 2011 in *Triangle Software, LLC. V. Garmin International, Inc. et al.*, Case No. 1: 10-cv-1457-CMH-TCB in the United States District Court for the Eastern District of Virginia, Alexandria Division, 6 pages.
Attachment B of Garmin's Preliminary Invalidity Contentions and Certificate of Service filed May 16, 2011 in *Triangle Software, LLC. V. Garmin International, Inc. et al.*, Case No. 1: 10-cv-1457-CMH-TCB in the United States District Court for the Eastern District of Virginia, Alexandria Division, 618 pages.
Audi-V150 Manual, Oct. 2001, 152 pages, Japan.
Balke, K.N., "Advanced Technologies for Communicating with Motorists: A Synthesis of Human Factors and Traffic Management Issues," Report No. FHWA/TX-92/1232-8, May 1992, Texas Department Transportation, Austin, TX, USA, 62 pages.
Barnaby J. Feder, "Talking Deals; Big Partners in Technology," Technology, The New York Times, Sep. 3, 1987.
Birdview Navigation System by Nissan Motor Corp, 240 Landmarks of Japanese Automotive Technology, 1995, 2 pages, Society of Automotive Engineers of Japan, Inc., Japan.
Blumentritt, K. et al., "Travel System Architecture Evaluation," Publication No. FHWA-RD-96-141, Jul. 1995, 504 pages, U.S. Department of Transportation, McLean, VA, USA.
Brooks, et al., "Turn-by-Turn Displays versus Electronic Maps: An On-the-Road Comparison of Driver Glance Behavior," Technical Report, The University of Michigan, Transportation Research Institute (UMTRI), Jan. 1999.
Burgett, A.L., "Safety Evaluation of TravTek," Vehicle Navigation & Information Systems Conference Proceedings (VNIS'91), P-253, Part 1, Oct. 1991, pp. 819-825, Soc. of Automotive Engineers, Inc., Warrendale, PA, USA.
Campbell, J.L. "Development of Human Factors Design Guidelines for Advanced Traveler Information Systems (ATIS)", Proceedings Vehicle Navigation and Information Systems Conference, 1995, pp, 161-164, IEEE, New York, NY, USA.
Campbell, J.L. "Development of Human Factors Design Guidelines for Advanced Traveler Information Systems (ATIS) and Commercial Vehicle Operations (CVO)", Publication No. FHWA-RD-98-057, Report Date Sep. 1998, 294, pages, U.S. Department of Transportation, McLean, VA 22010-2296.
Carin Navigation System Manual and Service Manual for Model Carin 22SY520, 76 pages, Philips Car Systems, The Netherlands.
Cathey, F.W. et al., "A Prescription for Transit Arrival/Department Prediction Using Automatic Vehicle Location Data," Transportation Research Part C 11, 2003, pp. 241-264, Pergamon Press Ltd., Elsevier Ltd., U.K.
Chien, S.I. et al., "Predicting Travel Times for the South Jersey Real-Time Motorist Information System," Transportation Research Record 1855, Paper No. 03-2750, Revised Oct. 2001, pp. 32-40.
Chira-Chavala, T. et al., "Feasibility Study of Advanced Technology HOV Systems," vol. 3: Benefit Implications of Alternative Policies for Including HOV lanes in Route Guidance Networks, Dec. 1992, 84 ages, UCB-ITS-PRR-92-5 PATH Research Report, Inst. of Transportation Studies, Univ. of Calif., Berkeley, USA.
Clark, E.L., Development of Human Factors Guidelines for Advanced Traveler Information Systems (ATIS) and Commercial Vehicle Operations (CVO): Comparable Systems Analysis, Dec. 1996, 199 pages.
Dancer, F. et al., "Vehicle Navigation Systems: Is America Ready?," Navigation and Intelligent Transportation System, Automotive Electronics Series, Society of Automotive Engineers, 1998, pp. Cover page, Table of Contents pp. 3-8.

Davies, P. et al., "Assessment of Advanced Technologies for Relieving Urban Traffic Congestion" National Cooperative Highway Research Program Report 340, Dec. 1991, 106 pages.
de Cambray, B. "Three-Dimensional (3D) Modeling in a Geographical Database," Auto-Carto'11, Eleventh International Conference on Computer Assisted Cartography, Oct. 30, 1993-Nov. 1, 1993, pp. 338-347, Minneapolis, USA.
Declaration Under 37 C.F.R. 1.131 and Source Code from U.S. Appl. No. 10/897,550.
Dillenburg, J.F. et al., "The Intelligent Travel Assistant," IEEE 5th International Conference on Intelligent Transportation Systems, Sep. 3-6, 2002, pp. 691-696, Singapore.
Dingus, T.A. et al., "Human Factors Engineering the TravTek Driver Interface," Vehicle Navigation & Information System Conference Proceedings (VNIS'91), P-253, Part 2, Oct. 1991, pp. 749-755, Soc. of Automotive Engineers, Inc., Warrendale, PA, USA.
Endo, et al., "Development and Evaluation of a Car Navigation System Providing a Birds Eye View Map Display," Navigation and Intelligent Transportation Systems, Automotive Electronics Series, Society of Automotive Engineers, 1998, pp. Cover page, Table of Contents, pp. 19-22.
Eppinger, A. et al., "Dynamic Route Guidance—Status and Trends," Convergence 2000 International Congress on Transportation Electronics, Oct. 16-18, 1999, 7 pages, held in Detroit, MI, SAE International Paper Series, Warrendale, PA, USA.
Expert Report of Dr. Michael Goodchild Concerning the Validity of U.S. 5,938,720 dated Jun. 16, 2011 in *Triangle Software, LLC* v. *Garmin International Inc. et al.*, in the United States District Court for the Eastern District of Virginia, Alexandria Division, Case No. 1:10-cv-1457-CMH-TCB, 16 pages.
Fawcett, J., "Adaptive Routing for Road Traffic," IEEE Computer Graphics and Applications, May/Jun. 2000, pp. 46-53, IEEE, New York, NY, USA.
Fleischman, R.N., "Research and Evaluation Plans for the TravTek IVHS Operational Field Test, "Vehicle Navigation & Information Systems Conference Proceedings (VNIS'91), P-253, Part 2, Oct. 1991, pp. 827-837, Soc. of Automotive Engineers, Inc., Warrendale, PA, USA.
Garmin International, Inc.'s Answer and Counterclaims to Triangle Software, LLC's Complaint.
Garmin International, Inc.'s Amended Answer and Counterclaims to Triangle Software, LLC's Complaint.
Garmin International, Inc. and Garmin USA, Inc.'s Answer and Counterclaim to Triangle Software, LLC's Supplemental Complaints filed Jun. 17, 2011 in *Triangle Software, LLC*. v. *Garmin International Inc. et al.*, in the United States District Court for the Eastern District of Virginia, Alexandria Division, Case No. 1:10-cv-1457-CMH-TCB, 36 pages.
Garmin's Preliminary Invalidity Contentions and Certificate of Service filed May 16, 2011 in *Triangle Software, LLC. V. Garmin International, Inc. et al.*, Case No. 1: 10-cv-1457-CMH-TCB in the United States District Court for the Eastern District of Virginia, Alexandria Division, 46 pages.
Goldberg et al., "Computing the Shortest Path: A* Search Meets Graph Theory," Proc. of the 16th Annual ACM-SIAM Sym. on Discrete Algorithms, Jan. 23-25, 2005. Vancouver, BC.
Goldberg et al., "Computing the Shortest Path: A* Search Meets Graph Theory," Microsoft Research, Technical Report MSR-TR-2004 Mar. 24, 2003.
Golisch, F., Navigation and Telematics in Japan, International Symposium on Car Navigation Systems, May 21, 1997, 20 pages, held in Barcelona, Spain.
GM Exhibits Prototype of TravTek Test Vehicle, Inside IVHS, Oct. 28, 1991, V. 1, No. 21, 2 pages.
Gueziec, Andre, "3D Traffic Visualization in Real Time," ACM Siggraph Technical Sketches, Conference Abstracts and Applications, p. 144, Los Angeles, CA, Aug. 2001.
Gueziec, A., "Architecture of a System for Producing Animated Traffic Reports," Mar. 30, 2011, 42 pages.
Handley, S. et al., "Learning to Predict the Duration of an Automobile Trip," Proceedings of the Fourth International Conference on Knowledge Discovery and Data Mining, 1998, 5 pages, AAAI Press, New York, NY, USA.

(56) References Cited

OTHER PUBLICATIONS

Hankey, et al., "In-Vehicle Information Systems Behavioral Model and Design Support: Final Report," Feb. 16, 2000, Publication No. 00-135, Research, Development, and Technology, Turner-Fairbank Highway Research Center, McLean, Virginia.
Hirata et al., "The Development of a New Multi-AV System Incorporating an On-Board Navigation Function," International Congress and Exposition, Mar. 1-5, 1993, pp. 1-12, held in Detroit, MI, SAE International, Warrendale, PA, USA.
Hoffmann, G. et al., Travel Times as a Basic Part of the LISB Guidance Strategy, Third International Conference on Road Traffic Control, May 1-3, 1990, pp. 6-10, London, U.K.
Hoffmann, T., "2005 Acura RL Prototype Preview," Auto123.com, 4 pages.
Hu, Z. et al., "Real-time Data Fusion on Tracking Camera Pose for Direct Visual Guidance," IEEE Vehicles Symposium, Jun. 14-17, 2004, pp. 842-847, held in Parma, Italy.
Hulse, M.C. et al., "Development of Human Factors Guidelines for Advanced Traveler Information Systems and Commercial Vehicle Operations: Identification of the Strengths and Weaknesses of Alternative Information Display Formats," Publication No. FHWA-RD-96-142, Oct. 16, 1998, 187 pages, Office of Safety and Traffic Operation R&D, Federal Highway Administration, USA.
Initial Expert Report of Roy Summer dated Jun. 16, 2011 in *Triangle Software, LLC v. Garmin International Inc. et al.*, in the United States District Court for the Eastern District of Virginia, Alexandria Division, Case No. 1:10-cv-1457-CMH-TCB, 289 pages.
Initial Expert Report of William R. Michalson, Ph.D. dated Jun. 17, 2011 in *Triangle Software, LLC v. Garmin International Inc. et al.*, in the United States District Court for the Eastern District of Virginia, Alexandria Division, Case No. 1:10-cv-1457-CMH-TCB, 198 pages.
Inman, V.W., et al., "TravTek Global Evaluation and Executive Summary," Publication No. FHWA-RD-96-031, Mar. 1996, 104 pages, U.S. Department of Transportation, McLean, VA, USA.
Inman, V.W., et al., "TravTek Evaluation Rental and Local User Study," Publication No. FHWA-RD-96-028, Mar. 1996, 110 pages, U.S. Department of Transportation, McLean, VA, USA.
Jiang, G., "Travel-Time Prediction for Urban Arterial Road: A Case on China," Proceedings Intelligent Transportation Systems, Oct. 12-15, 2003, pp. 255-260, IEEE, New York, NY, USA.
Karabassi, A. et al., "Vehicle Route Prediction and Time and Arrival Estimation Techniques for Improved Transportation System Management," in Proceedings of the Intelligent Vehicles Symposium, 2003, pp. 511-516, IEEE, New York, NY, USA.
Koller, D. et al., "Virtual GIS: A Real-Time 3D Geographic Information System," Proceedings of the 6th IEEE Visualization Conference (Visualization 95) 1995, pp. 94-100, IEEE, New York, NY, USA.
Kopitz et al., Table of Contents, Chapter 6, Traffic Information Services, and Chapter 7, Intelligent Transport Systems and RDS-TMC in RDS: The Radio Data System, 1992, Cover p.-XV, pp. 107-167, Back Cover page, Artech House Publishers, Boston, USA and London, Great Britain.
Krage, M.K., "The TravTek Driver Information System," Vehicle Navigation & Information Systems Conference Proceedings (VNIS'91), P-253, Part 1, Oct. 1991, pp. 739-748, Soc. of Automotive Engineers, Inc., Warrendale, PA, USA.
Ladner, R. et al., "3D Mapping of Interactive Synthetic Environment," Computing Practices, Mar. 2000, pp. 33-39, IEEE, New York, NY, USA.
Levinson, D., "Assessing the Benefits and Costs of Intelligent Transportation Systems: The Value of Advanced Traveler Information System," Publication UCB-ITS-PRR-99-20, California Path Program, Jul. 1999, Institute of Transportation Studies, University of California, Berkeley, CA, USA.
Lowenau, J., "Final Map Actualisation Requirements," Version 1.1, ActMAP Consortium, Sep. 30, 2004, 111 pages.
Meridian Series of GPS Receivers User Manual, Magellan, 2002, 106 pages, Thales Navigation, Inc., San Dimas, CA, USA.
Ness, M., "A Prototype Low Cost In-Vehicle Navigation System," IEEE-IEE Vehicle Navigation & Information Systems Conference (VNIS), 1993, pp. 56-59, New York, NY, USA.
N'FIT XANAVI, unknown date, 94 pages, Japana.
Nintendo Wii Operations Manual Systems Setup. 2009.
Nissan Automobile Navigation System User Manual, [date unknown], 163 pages.
Noonan, J., "Intelligent Transportation Systems Field Operational Test Cross-Cutting Study Advanced Traveler Information Systems," Sep. 1998, 27 pages, U.S. Department of Transportation, McLean, VA, USA.
Odagaki et al., Automobile Navigation System with Multi-Source Guide Information, International Congress & Exposition, Feb. 24-28, 1992, pp. 97-105. SAE International, Warrendale, PA, USA.
Panasonic Portable Navigation System User Manual for Products KX-GT30, KX-GT30X, and KX-GT30Z, Cover page, pp. 1-5, 132-147, End pages, Matsushita Denki Sangyo K.K., Fukuoka City, Japan [Date Unknown].
Preliminary Invalidity Contentions of Defendant TomTom, Inc., Certificate of Service and Exhibit a filed May 16, 2011 in *Triangle Software, LLC. V. Garmin International, Inc. et al.*, Case No. 1: 10-cv-1457-CMH-TCB in the United States District Court for the Eastern District of Virginia, Alexandria Division, 354 pages.
Raper, J.F., "Three-Dimensional GIS," in Geographical Information Systems: Principles and Applications, 1991, vol. 1, Chapter 20, 21 pages.
"References Manual for the Magellan RoadMate 500/700." 2003, 65 pages, Thales Navigation, Inc., San Dimas, CA, USA.
Riiett, L.R., "Simulating the TravTek Route Guidance Logic Using the Integration Traffic Model," Vehicle Navigation & Information System, P-253, Part 2, Oct. 1991, pp. 775-787, Soc. of Automotive Engineers, Inc., Warrendale, PA, USA.
Rillings, J.H., "Advanced Driver Information Systems," IEEE Transactions on Vehicular Technology, Feb. 1991, vol. 40, No. 1, pp. 31-40, IEEE, New York, NY, USA.
Rillings, J.H., "TravTek," Vehicle Navigation & Information System Conference Proceedings (VNIS'91), P-253, Part 2, Oct. 1991, pp. 729-737, Soc. of Automotive Engineers, Inc., Warrendale, PA, USA.
Rockwell, Mark, "Telematics Speed Zone Ahead," Wireless Week, Jun. 15, 2004, Reed Business Information, http://www.wirelessweek.com.
Rupert, R.L., "The TravTek Traffic Management Center and Traffic Information Network," Vehicle Navigation & Information System Conference Proceedings (VNIS'91), P-253, Part 1, Oct. 1991, pp. 757-761, Soc. of Automotive Engineers, Inc., Warrendale, PA, USA.
Schofer, J.L., "Behavioral Issues in the Design and Evaluation of Advanced Traveler Information Systems," Transportation Research Part C 1, 1993, pp. 107-117, Pergamon Press Ltd., Elsevier Science Ltd.
Schulz, W., "Traffic Management Improvement by Integrating Modem Communication Systems," IEEE Communications Magazine, Oct. 1996, pp. 56-60, New York, NY, USA.
Shepard, I.D.H., "Information Integration and GIS," in Geographical Information Systems: Principles and Applications, 1991, vol. 1, pp. Cover page, 337-360, end page.
Sirius Satellite Radio: Traffic Development Kit Start Up Guide, Sep. 27, 2005, Version 00.00.01, NY, New York, 14 pages.
Slothhower, D., "Sketches & Applications," SIGGRAPH 2001, pp. 138-144, Stanford University.
Sumner, R., "Data Fusion in Pathfinder and TravTek," Part 1, Vehicle Navigation & Information Systems Conference Proceedings (VNIS'91), Oct. 1991, Cover & Title page, pp. 71-75.
Supplemental Expert Report of William R. Michalson, Ph.D. Regarding Invalidity of the Patents-in-Suit dated Jul. 5, 2011 in *Triangle Software, LLC v. Garmin International Inc. et al.*, in the United States District Court for the Eastern District of Virginia, Alexandria Division, Case No. 1:10-cv-1457-CMH-TCB, 23 pages.
Tamuara et al., "Toward Realization of VICS—Vehicle Information and Communications System," IEEE-IEE Vehicle Navigation & Information Systems Conference (VNIS'93), 1993, ppg. 72-77, held in Ottawa, Canada.

(56) References Cited

OTHER PUBLICATIONS

Taylor, K.B., "TravTek-Information and Services Center," Vehicle Navigation & Information System Conference Proceedings (VNIS'91), P-253, Part 2, Oct. 1991, pp. 763-774, Soc. of Automotive Engineers, Inc., Warrendale, PA, USA.
Texas Transportation Institute, "2002 Urban Mobility Study: 220 Mobility Issues and Measures: The Effects of Incidents—Crashes and Vehicle Breakdowns" (2002).
"The Challenge of VICS: The Dialog Between the Car and Road has Begun," Oct. 1, 1996, pp. 19-63, The Road Traffic Information Communication System Centre (VICS Centre), Tokyo, Japan.
Thompson, S.M., "Exploiting Telecommunications to Delivery Real Time Transport Information," Road Transport Information and Control, Conf. Publication No. 454, Apr. 21-23, 1998, pp. 59-63, IEE, U.K.
Tonjes, R., "3D Reconstruction of Objects from Ariel Images Using a GIS," presented at ISPRS Workshops on "Theoretical and Practical Aspects of Surface Reconstructions and 3-D Object Extraction" Sep. 9-11, 1997, 8 pages, held in Haifa, Israel.
"TRAVTEK Information and Services Center Policy/Procedures Manual," Feb. 1992, 133 pages, U.S. Department of Transportation, McLean, VA, USA.
Truett, R., "Car Navigation System May Live on After Test," The Orlando Sentinel, Feb. 17, 1993, p. 3 pages.
U.S. Dept. of Transportation, Closing the Data Gap: Guidelines for Quality Advanced Traveler Information System (ATIS) Data, Version 1.0, Sep. 2000, 41 pages.
User Guide of Tom Tom ONE; 2006.
Vollmer, R., "Navigation Systems—Intelligent Co-Drivers with Knowledge of Road and Tourist Information," Navigation and Intelligent Transportation Systems, Automotive Electronics Series, Society of Automotive Engineers, 1998, pp. Cover page, Table of Contents, pp. 9-17.
Volkswagen Group of America, Inc.'s Answer and Counterclaim.
Watanabe, M. et al., "Development and Evaluation of a Car Navigation System Providing a Bird's-Eye View Map Display," Technical Paper No. 961007, Feb. 1, 1996, pp. 11-18, SAE International.
Wischhof, L. et al., "SOTIS—A Self-Organizing Traffic Information System," Proceedings of the 57th IEEE Vehicular Technology Conference (VTC—03), 2003, pp. 2442-2446, New York, NY, USA.
WSI, "TrueView Interactive Training Manual, Showfx Student Guide," Print Date: Sep. 2004, Document Version: 4.3x. Link: http://apollo.lsc.vsc.edu/intranet/WSI_Showfx/training/970-TVSK-SG-43.pdf.
XM Radio Introduces Satellite Update Service for Vehicle Navigation, Apr. 8, 2004, 2 pages.
Yim et al., TravInfo. Field Operational Test Evaluation "Evaluation of TravInfo Field Operation Test" Apr. 25, 2000.
Yim et al., "TravInfo Field Operational Test Evaluation: Information Service Providers Customer Survey" (2000).
Yokouchi, K., "Car-Navigation Systems," Mitsubishi Electr. Adv. Technical Reports, 2000, vol. 91, pp. 10-14, Japan.
You, J. et al., "Development and Evaluation of a Hybrid Travel Time Forecasting Model," Transportation Research Parc C 9, 2000, pp. 231-256, Pergamon Press Ltd., Elsevier Science Ltd., U.K.
Zhao, Y., "Vehicle Location and Navigation Systems," 1997, 370 pages, Arthech House, Inc., Norwood, MA, USA.
Zhu, C. et al. "3D Terrain Visualization for Web GIS," Center for Advance Media Technology, Nanyang Technological University, Singapore, 2003, 8 pages.
PCT Application No. PCT/US2004/23884, Search Report and Written Opinion mailed Jun. 17, 2005.
PCT Application No. PCT/US2011/48680, Search Report and Written Opinion mailed Feb. 7, 2012.
PCT Application No. PCT/US2011/51647, Search Report and Written Opinion mailed Feb. 2, 2012.
PCT Application No. PCT/US2011/60663, Search Report and Written Opinion mailed May 31, 2012.
PCT Application No. PCT/US2012/38702, Search Report and Written Opinion mailed Aug. 24, 2012.
EP Patent Application No. 11 825 897.9, Communication mailed May 3, 2013.
U.S. Appl. No. 10/379,967, Final Office Action mailed May 11, 2005.
U.S. Appl. No. 10/379,967, Office Action mailed Sep. 20, 2004.
U.S. Appl. No. 10/897,550, Office Action mailed Jun. 12, 2009.
U.S. Appl. No. 10/897,550, Office Action mailed Jan. 21, 2009.
U.S. Appl. No. 10/897,550, Office Action mailed Aug. 1, 2008.
U.S. Appl. No. 10/897,550, Office Action mailed Oct. 3, 2007.
U.S. Appl. No. 11/509,954, Office Action mailed Nov. 23, 2007.
U.S. Appl. No. 11/751,628, Office Action mailed Jan. 29, 2009.
U.S. Appl. No. 12/283,748, Office Action mailed Aug. 20, 2009.
U.S. Appl. No. 12/283,748, Office Action mailed Mar. 11, 2009.
U.S. Appl. No. 12/398,120, Final Office Action mailed Mar. 26, 2013.
U.S. Appl. No. 12/398,120, Office Action mailed Nov. 14, 2012.
U.S. Appl. No. 12/398,120, Final Office Action mailed Apr. 12, 2012.
U.S. Appl. No. 12/398,120, Office Action mailed Nov. 15, 2011.
U.S. Appl. No. 12/763,199, Final Office Action mailed Nov. 1, 2010.
U.S. Appl. No. 12/763,199, Office Action mailed Aug. 5, 2010.
U.S. Appl. No. 12/860,700, Office Action mailed Feb. 26, 2013.
U.S. Appl. No. 12/881,690, Office Action mailed Apr. 22, 2013.
U.S. Appl. No. 12/967,045, Final Office Action mailed Jun. 27, 2012.
U.S. Appl. No. 12/967,045, Office Action mailed Jul. 18, 2011.
U.S. Appl. No. 13/296,108, Office Action mailed May 9, 2013.
U.S. Appl. No. 13/316,250, Office Action mailed Jan. 18, 2013.
U.S. Appl. No. 13/561,269, Office Action mailed Dec. 13, 2012.
U.S. Appl. No. 13/561,327, Office Action mailed Oct. 26, 2012.

\* cited by examiner

US 8,725,396 B2

SYSTEM FOR PROVIDING TRAFFIC DATA AND DRIVING EFFICIENCY DATA

CROSS-REFERENCE TO RELATED APPLICATIONS

This application claims the priority benefit of U.S. Provisional Application Ser. No. 61/487,425, titled "Developing and Supporting High Usage Traffic Information Mobile Apps," filed May 18, 2011, the disclosure of which is incorporated herein by reference.

BACKGROUND OF THE INVENTION

As mobile devices become more popular among users, developers provide more applications. One type of application for mobile devices provides traffic information for roadways. Typically, the traffic information is provided on a display as a color coded roadway. For example, if traffic is flowing as normal the roadway may be highlighted in green. If traffic is disrupted, traffic may be highlighted in red.

Traffic information for existing mobile device applications is often unreliable. The traffic data may only be from a single source and may often be unavailable. As a result, the traffic information may be unreliable and frustrating for users.

There is a need in the art for an improved traffic data processing system for mobile devices.

SUMMARY OF THE CLAIMED INVENTION

The present technology provides current and predicted traffic information from incident data, traffic flow data, and media related to traffic received from multiple sources. The crowd sourced data may be provided passively by applications on remote mobile devices or actively by users operating the remote mobile devices. An application on a mobile device may receive the multiple data types, aggregate and validate the data, and provides traffic information for a user. The traffic information may relate to the current position and route of the user or a future route. The present technology may also provide driving efficiency information such as fuel consumption data, carbon footprint data, and a driving rating for a user associated with a vehicle.

In an embodiment, a method for processing traffic data, beings with receiving traffic data by a mobile device. The traffic data may originate from multiple sources. Traffic information may then be provided through an interface of the mobile device. The mobile device may also provide driving efficiency information through the interface. The driving efficiency information may include fuel consumption, carbon footprint data, and a driver rating.

DETAILED DESCRIPTION

The present technology provides current and predicted traffic information from multiple types of traffic data received from multiple sources. Traffic data such as incident data, traffic flow data, and media related to traffic may be received by a mobile device. The traffic data may originate from public entities, private companies, and crowd sourcing. The crowd sourced data may be provided passively by applications on remote mobile devices or actively by users operating the remote mobile devices. An application on a mobile device receives the multiple data types, aggregates the data, validates the data, and provides traffic information for a user. The traffic information may relate to the current position and route of the user or a future route.

The present technology may also provide driving efficiency information. The driving efficiency information may include fuel consumption data, carbon footprint data, and a driving rating for a user associated with a vehicle. The fuel consumption data may be generated from vehicle speed and acceleration as determined by positioning system data provided to a mobile device application, as well as vehicle information provided by a user or other source. The carbon footprint may be derived from the fuel consumption by the vehicle. The driver rating may be determined based on fuel consumption and various EPA specifications for a vehicle or other information.

Figure 1:
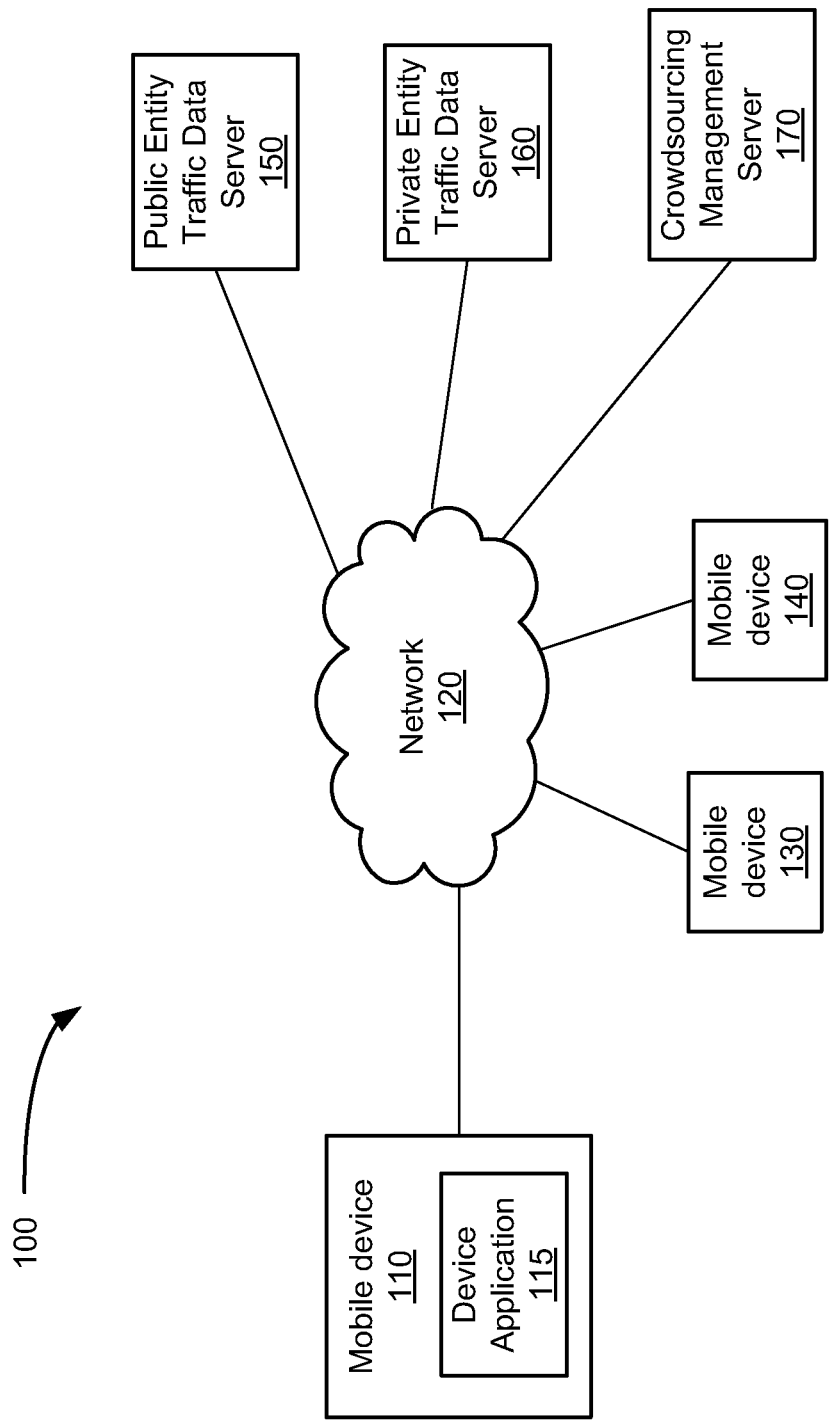
FIG. 1 is a block diagram of an exemplary system for analyzing traffic data.

FIG. 1 is a block diagram of an exemplary system 100 for analyzing traffic data. System 100 includes mobile devices 110, 130 and 140, network 120, public entity traffic data server 150, private entity traffic data server 160, and crowd sourcing management server 170. Mobile device 100 may communicate with network 120 and be operated by a user in a moving vehicle. Mobile device 110 may include circuitry, logic, software, and other components for determining a position, speed, and acceleration of the mobile device. In some embodiments, mobile device 110 may include a global positioning system (GPS) mechanism for determining the location of the device. Based on the location data, the speed and acceleration of the device may be determined.

Mobile device 110 may also include device application 115. Device application 115 may be stored in memory and executed by one or more processors to process the GPS data, locally collected data and other data received over network 120 to provide traffic information, eco-information, and driving rating information through a display of mobile device 110.

Network 120 may communicate with mobile devices 110, 130 and 140 and data servers 150, 160 and 170. Network 120 may include a private network, public network, local area network, wide area network, the Internet, an intranet, and a combination of these networks.

Mobile devices 130 and 140 may also be associated with a respective vehicle and may include GPS or other position detection mechanisms. Each mobile device 130 and 140 may include a device application which may actively or passively provide traffic data and other data to crowd sourcing management server 170 over network 120. For example, when a device application stored on mobile device 130 is executing and the vehicle containing mobile device 130 is moving, the mobile application may passively provide data by transmitting position, speed and acceleration data detected by a GPS unit to crowd sourcing management server 170.

Mobile device 130 may also provide active data to crowd sourcing management server 170. A user may capture an image or video of a traffic incident or create an incident report by providing information of a collision, stalled car, or other event that affects traffic. The user may provide the image, video, or incident report to the device application, which in turn transmits the content to crowd sourcing management server 170.

Public entity traffic data server 150 may include one or more servers, including one or more network servers, web servers, applications servers and database servers, that provide traffic data by a public sector organization. The public sector organization may be, for example, the Department of Transportation or some other public entity. Public entity traffic data server 150 may provide traffic data such as incident data for a planned or unplanned traffic incident, traffic speed and flow data, or traffic camera image and video data. A planned traffic incident may include data for a highway closure or construction work. An unplanned traffic incident may include data for a disabled vehicle or a car crash. The traffic speed and flow data may be determined from radar outposts, toll booth data collection, or other data. The traffic camera image and video may be collected by public sector traffic cams located on roadways.

Private entity traffic data server 160 may include one or more servers, including one or more network servers, web servers, applications servers and database servers, that provide traffic data such as incident data, traffic speed and flow data and traffic camera and image data. Examples of private entity traffic data servers are those provided by companies such as Inrix, Traffic Cast, Clear Channel, and Traffic.com.

Crowd sourcing management server 170 may include one or more servers, including one or more network servers, web servers, applications servers and database servers, that receive crowd source data from mobile devices 110, 130 and 140, aggregate and organize the data, and provide traffic data to a device application on any of mobile devices 110, 130 or 140. Data is received from a plurality of remote mobile device applications regarding current traffic information. The traffic information is aggregated to create a unified set of data and broadcast to mobile devices to which the data is relevant.

In some embodiments, crowd sourcing data is transmitted directly between mobile devices. Hence, data which is passive and actively collected by mobile device 110 may be transmitted directly to mobile devices 130 and 140 via network 120, without involving crowd sourcing management server 170.

Figure 2:
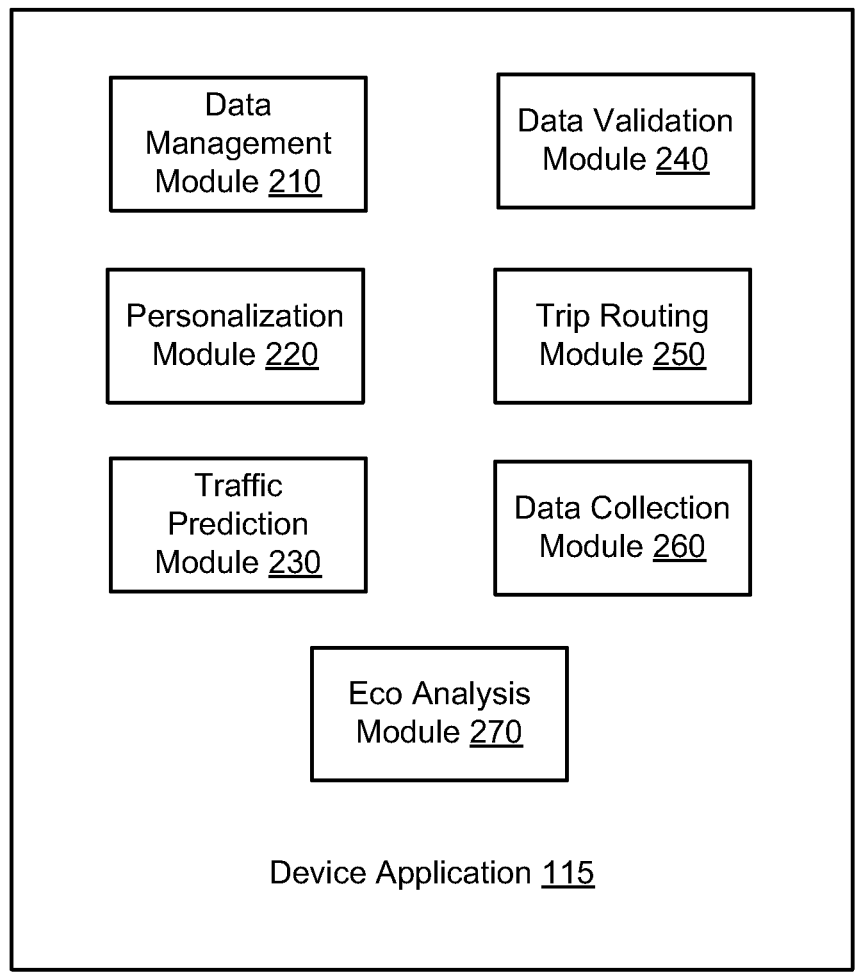
FIG. 2 is a block diagram of an exemplary device application.

FIG. 2 is a block diagram of an exemplary device application 115. Device application 115 may include a data management module 210, personalization module 220, traffic prediction module 230, data validation module 240, trip routing module 250, data collection module 260, and eco analysis module 270. Data management module 210 may receive various types of data from different data sources. The data types may include incident data, traffic speed and flow data, and traffic camera, image and video data. The data sources may include crowd sourcing, public entity network services and private company network services. Module 210 may sort the received data and provide the data to data validation module 240.

Personalization module 220 may store and provide data regarding a particular user's preferred or favorite route, interface preferences, and other parameters that a user of device application 115 has set to customize their experience. Personalization module 220 may distill all the received data and present the user with only the relevant part according to received user criteria. The criteria may include user location (received from the mobile device), profile data, various start and end locations for routes they are likely to take, specified types of traffic information they are most interested in, and certain traffic cameras they are interested in for snapshots.

Traffic prediction module 230 may predict traffic along a user's specified route, a particular location at a particular time or period of time, or for some other roadway in the future. The prediction engine 230 learns about recurring traffic speeds at certain locations and times, and displays to the user forecasted traffic conditions on a user-centered map at various points of time as requested by the user. In this way, the system may provide to a user information such that the user can make an informed decision on whether to delay a departure, leave on time, or leave earlier if possible.

Data validation module 240 may receive data for a particular point from data management module 210. Validation module 240 may then determine if all the data points for the particular traffic points are valid. For example, if device application 115 receives multiple points of traffic data indicating different traffic speeds at a particular road for a particular time as a result of crowd sourcing data, data validation module 240 may validate the collection of data for the traffic point by removing an anomaly data point from that data set.

Data validation module 240 may implement a quality process which acts on the input data and validates it for various criteria including timeliness. The relevance of a quality process helps address data sources which are subject to being unavailable due to network connection (i.e., cellular) becoming temporarily unavailable or various types of disruptions with the data source itself. By entirely relying on just one data source and reproducing it exactly for the end user, the result for data disruption would potentially detrimental to the user/traveler. For example, the absence/intermittence of a displayced incident potentially being interpreted as the roadway being clear, just because the source became temporarily unavailable.

Trip routing module 250 allows a user to select routes between points of travel, and provides traffic predictions for the travel route. The travel prediction is provided by trip routing module 250 through an interface and is received by routing module 250 from traffic prediction module 230. The routing module may provide point to point trip times, as well as trip time predictions for various departure times, and various days of the week.

Data collection module 260 may collect data from device application 115 and mobile device 110 with respect to crowd sourcing data. The crowd sourcing data may include current location, speed and acceleration of the mobile device. The crowd sourcing data may also include data actively provided by a user, such as video, incident report, or other data.

In some embodiments, when the present application is executing and a GPS module on device 110 is operating, location data may be collected with a sampling interval and a transmission interval. The sampling interval and transmission interval may be selected so as to optimize latency and data relevance while minimizing data transmission costs for the user of the mobile device. Data is transmitted to data management module 210 by the data collection module 260 and may be provided to other mobile devices. The data may be provided to other mobile devices through a crowd sourcing management server 170 or via direct communication between mobile devices.

Eco analysis module 270 may determine a user rating, carbon footprint, fuel consumption, and other driver related data based on activity data processed by device application 115. Information provided by eco analysis module 270 is discussed in more detail below.

Figure 3:
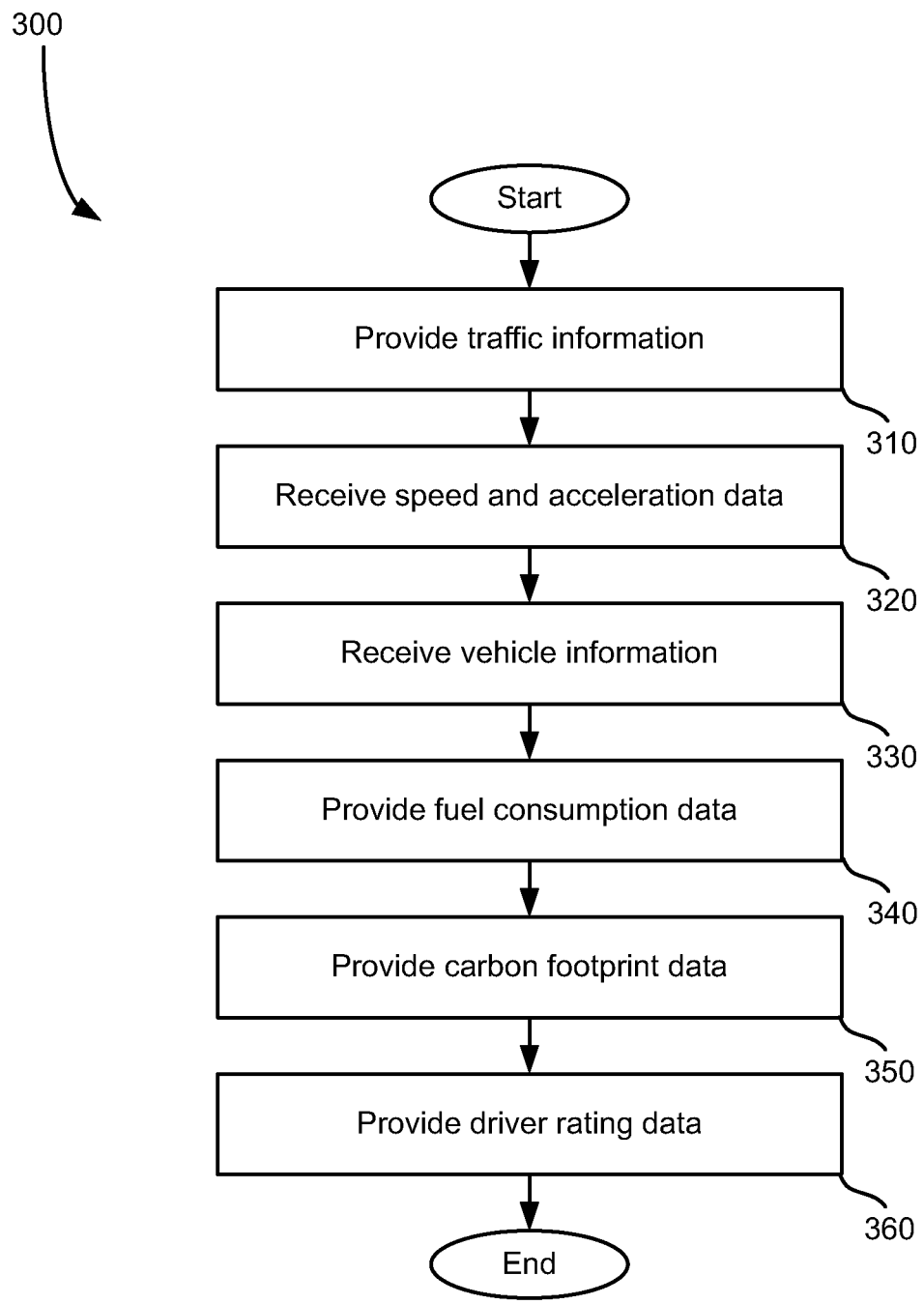
FIG. 3 is an exemplary method for processing traffic data.

FIG. 3 is an exemplary method for processing traffic data. The method of FIG. 3 is performed by device application 115. Traffic information is provided at step 310. Providing traffic information may include providing an indication of the current or predicted traffic for a particular location through a display of mobile device 110. The traffic information may be generated based on multiple data types received form multiple data sources. Providing traffic information is discussed in more detail below with respect to the method of FIG. 4.

Speed and acceleration data are received at step 320. The data collection module 250 may receive data provided by a GPS system, mobile device accelerometer components, and other sources. Vehicle information is then received at step 330. The vehicle information may be received by device application 115 from user input received by mobile device 110. The input may indicate the user's car make, model and year. Upon receiving this information, device application 115 may retrieve the vehicle mass, front area, and drag efficient from a data store maintained at mobile device 110. This information may be used to determine fuel consumption by application 115.

Fuel consumption data may be provided to a user at step 340. Device application 115 may provide fuel consumption data based on the car specification and car activity. Providing fuel consumption data is discussed in more detail below with respect to the method of FIG. 5.

A carbon footprint data is provided for a particular user at step 350. The carbon footprint data may be based on the fuel consumed by the driver as determined by device application 115. The fuel consumed corresponds to the exhaust generated by the car, and therefore the carbon footprint data can be determined accordingly. For example, a gallon of gasoline emits 8.7 kg of $CO_2$ into the atmosphere.

A driver rating is generated and provided for the user of the mobile device at step 360. A driver rating may be provided in a variety of ways. For example, Environment Protection Agency (EPA) statistics may be used to provide a driver rating. Alternatively, an ideal trip comparison with the user's actual trip may be determined to generate a driver rating. Providing a driver rating is discussed in more detail below with respect to FIGS. 6 and 7.

Figure 4:
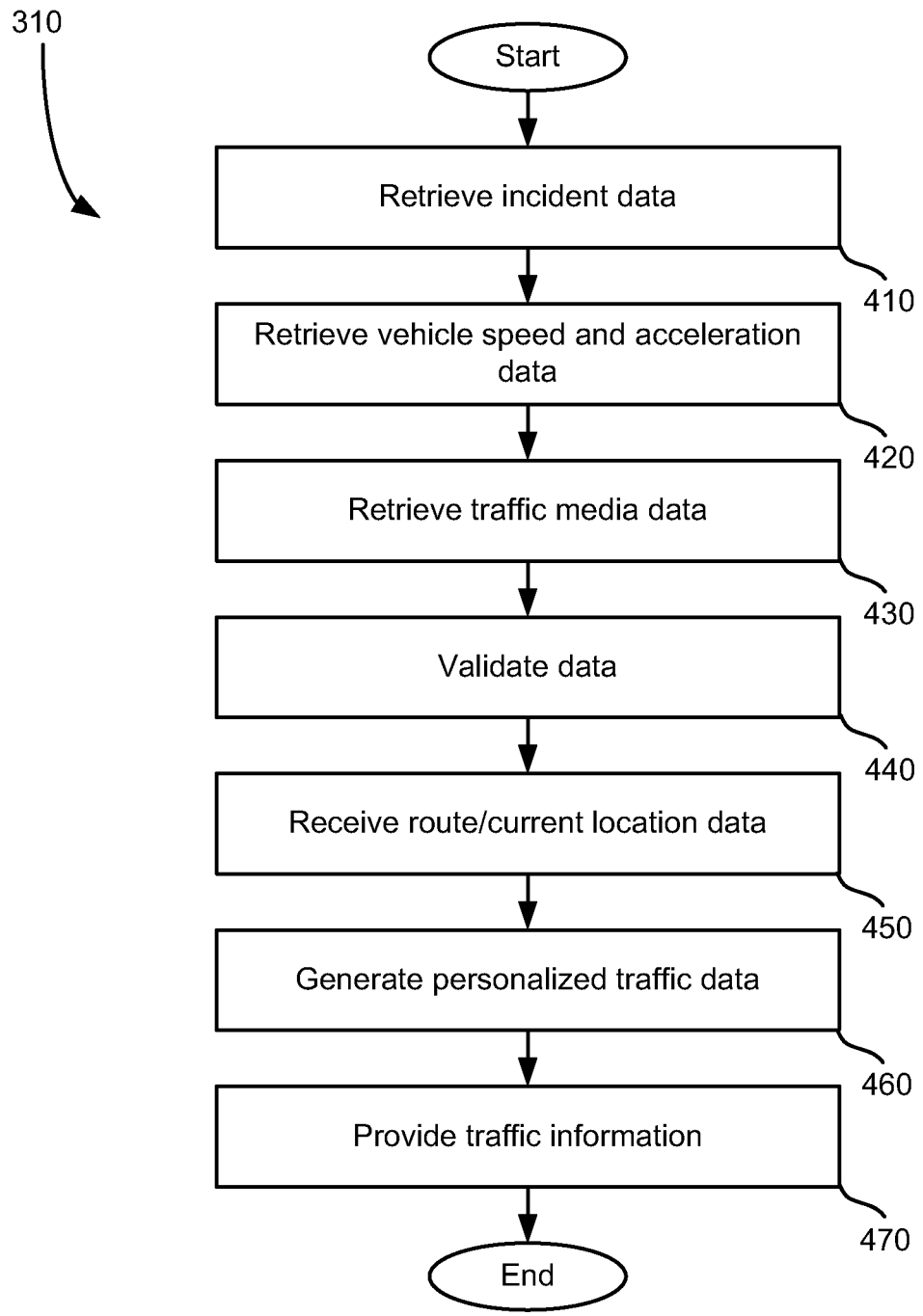
FIG. 4 is an exemplary method for providing traffic information.

FIG. 4 is an exemplary method for providing traffic information. The method of FIG. 4 provides more information for step 310 of the method of FIG. 3. Incident data is retrieved at step 410. The incident data may be retrieved locally from the mobile device 110 and remotely from crowd sourcing management server 170. The incident data may include planned and unplanned incidents as discussed herein.

Vehicle data and acceleration data may be retrieved at step 420. The vehicle speed and acceleration data may be retrieved from GPS components within mobile device 110. The GPS data may include a longitude, latitude and other data. Traffic media data may be retrieved at step 430. The traffic media data may include images and video associated with the user's current location or planned route. The received incident data, traffic media data, and GPS data may be validated at step 440. Data validation may include removing anomalies in sets of traffic data associated with a current point or route.

Route or current location data is received at step 450. The current location may be determined by a GPS component in mobile device 110 while a route may be received from a user through an interface at mobile device 110. Personalized traffic data is then generated for the user at step 460. The personalized traffic data may include a type of traffic information to display, settings for an interface in which to display the traffic, and other personalizations. The traffic information is then provided to the user at step 470. The information may be provided to the user through an interface of mobile device 110 by device application 115. The traffic information may be updated periodically and is based on types of data provided by multiple sources. The frequency at which the traffic information is updated may be selected by a user or set by the device application, and may be based on the balance of accuracy versus the battery performance.

Figure 5:
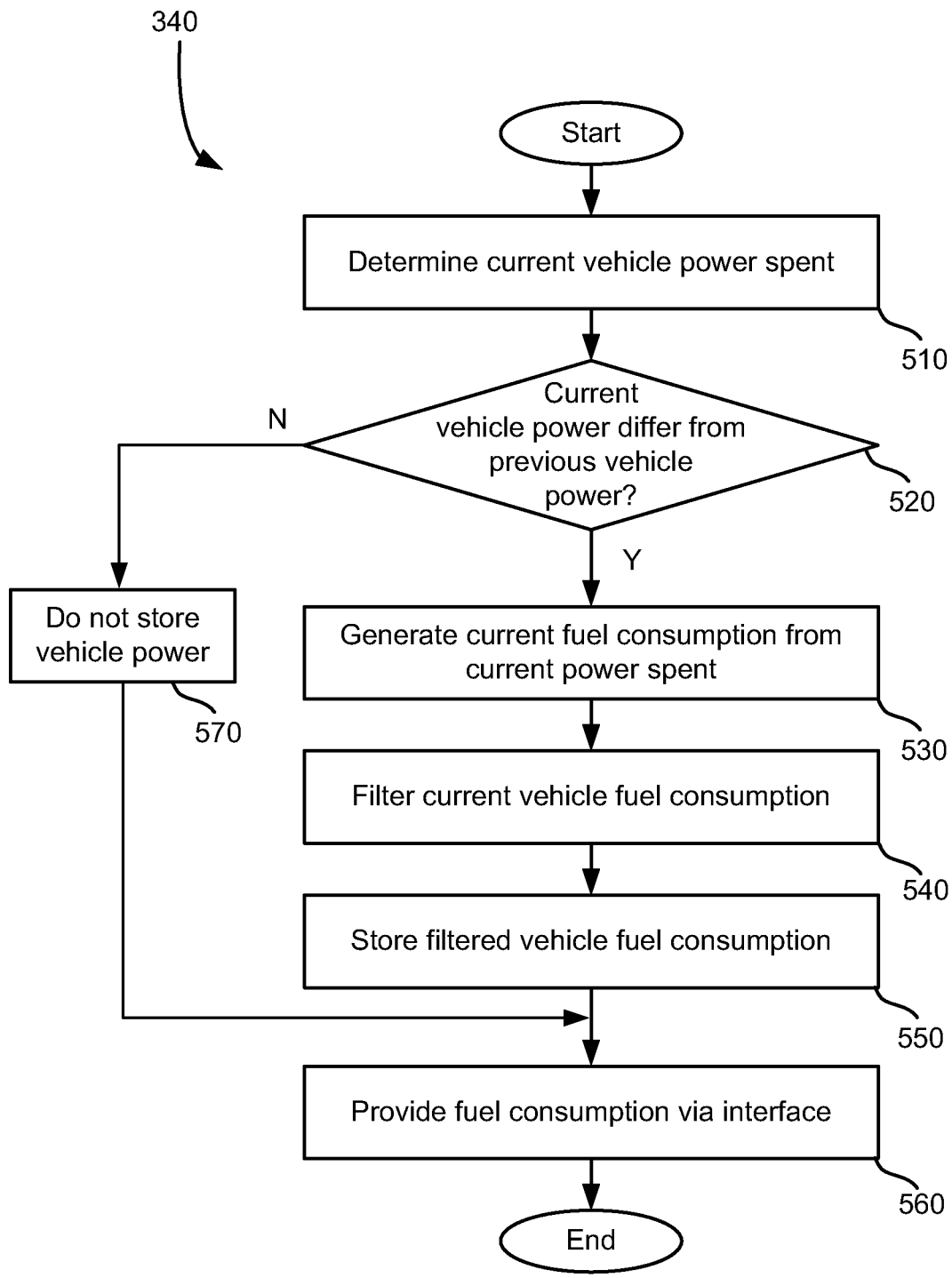
FIG. 5 is an exemplary method for providing fuel consumption data.

FIG. 5 is an exemplary method for providing fuel consumption data. The method of FIG. 5 provides more detail for step 340 of the method of FIG. 3. First, a current vehicle power spent is determined by a user at step 510. The current vehicle power may be estimated using the speed, the acceleration and the car's specification information, according to H. Rakha et. al's paper "Simple Comprehensive Fuel Consumption and CO2 Emission Model based on Instantaneous Vehicle Power":

$$P = (\text{Force}(t) * v(t)/(3600 \cdot \eta),$$

with $\text{Force}(t) = \rho \cdot C_D \cdot C_h \cdot A_f \cdot v(t)^2/25.92 + g \cdot m \cdot C_r \cdot (C1 \cdot v(t) + C2) + g \cdot m \cdot G(t) + m \cdot a(t)/1.04$, and $P$ in kW, with $v$ in km/h, $a(t)$ in m/s/s.

In the calculation, $\rho$ is the density of air at sea level at a temperature of 15° C. (59° F.), $C_D$ is the drag coefficient (unitless), $C_h$ is a correction factor for altitude (unitless), $A_f$ is the vehicle frontal area (m2), v(t) is the vehicle speed at time t, Cr, c1, and c2 are rolling resistance parameters that vary as a function of the road surface type, road condition, and vehicle tire type, m is the vehicle mass (kg), a(t) is the vehicle acceleration (m/s$^2$) at time t, g=9.8066, and G(t) is the vertical acceleration.

A determination is then made as to whether the current vehicle power differs from the previous vehicle power at step 520. In some embodiments, the current vehicle power might be analyzed to determine if it differs from the previous vehicle power or is within an acceptable threshold range of the previous vehicle power trend data, such as within 5%. If the current vehicle power does not differ from the previous vehicle power by greater than a threshold amount, the vehicle power is not stored and the fuel consumption is not determined for the vehicle power. Rather, the current fuel consumption is set as the previous fuel consumption and the method of FIG. 5 continues to step 560.

If the current vehicle power does differ from the previous vehicle power, current fuel consumption is generated from the current power spent at step 530. The current fuel consumption may be generated as a function of power:

$$FC(t) = \alpha_0 + \alpha_1 \cdot P(t) + \alpha_2 \cdot P(t)^2,$$

The coefficients of this second order polynomial may be calculated with the EPA estimations.

The current vehicle fuel consumption is then filtered at step 540. The vehicle fuel consumption may be filtered using a variety of techniques, such as a median filter, average filter, or least square filter. The filtered vehicle fuel consumption value is then stored at step 550 but the filtered vehicle fuel consumption may be stored locally at mobile device 110. The fuel consumption value is then provided through an interface to a user of mobile device 110 at step 560.

Figure 6:
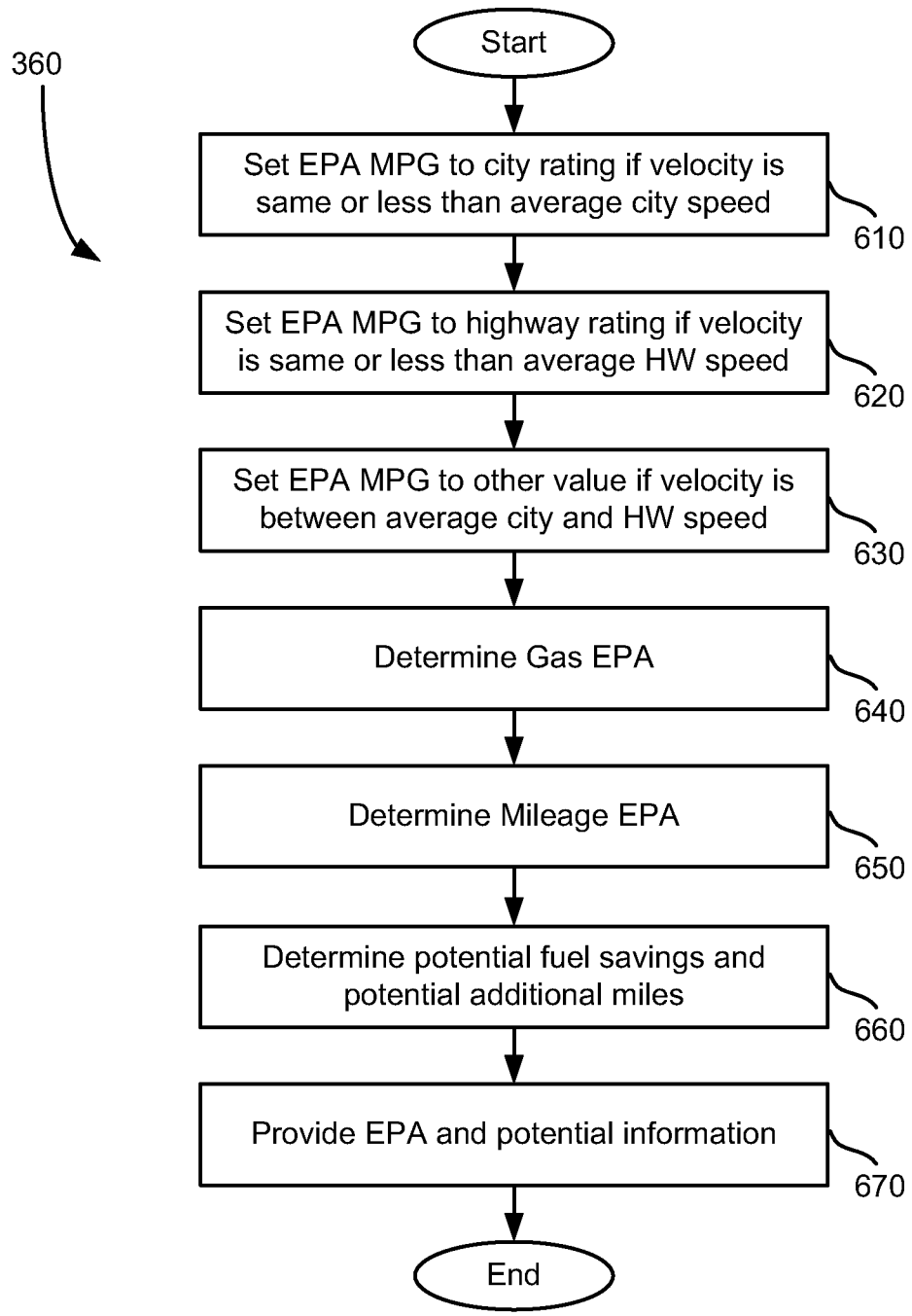
FIG. 6 is an exemplary method for providing driver rating data.

FIG. 6 is an exemplary embodiment for providing driver rating data. The method of FIG. 6 provides more detail for an embodiment of step 360 of the method of FIG. 3. An EPA miles per gallon (MPG) is set to a city rating if the detected velocity of the mobile device (and corresponding vehicle) is the same or less than the average city speed at step 610. In some embodiments, the average city speed may be set at 21 miles per hour. Therefore, if a user is currently traveling or has shown a trend of traveling at 21 miles per hour or less, the EPA MPG is set to the vehicles city MPG rating.

The EPA MPG is set to the vehicle's highway MPG rating if the mobile device's detected velocity is the same or greater than an average highway speed at step 620. In some embodiments, the average highway speed may be 48 miles per hour.

The EPA mpg may be set to a value between the city MPG and highway MPG if the velocity is between the average city speed and average highway speed at step 630. In some embodiments, the EPA MPG may be set to a value proportionally between the city and highway MPG values based on where the velocity value is between the average city speed and the average highway speed. In some embodiments the following formula may be used to determine the EPA mpg for a speed between the city speed and highway speed.

EPA MPG=$(r*EFhwy+(1-r)*EFcity)$, where $r=(speed-21.81)/(48.27-21.81)$.

An EPA gas spent value is determined at step 640. The EPA gas spent value is determined as the actual distance divided by the EPA mpg value determined previously. The EPA mileage traveled value is determined at step 650. The EPA mileage traveled value is determined as the EPA mpg times the fuel consumption by the user.

The potential fuel savings and potential additional miles for the user are determined at step 660. The potential fuel savings and additional miles is determined by calculating the difference between the actual fuel spent and miles traveled from the EPA fuel spent and mileage traveled. Next, the EPA and potential information is provided to a user through an interface provided by application 115 at step 670.

Figure 7:
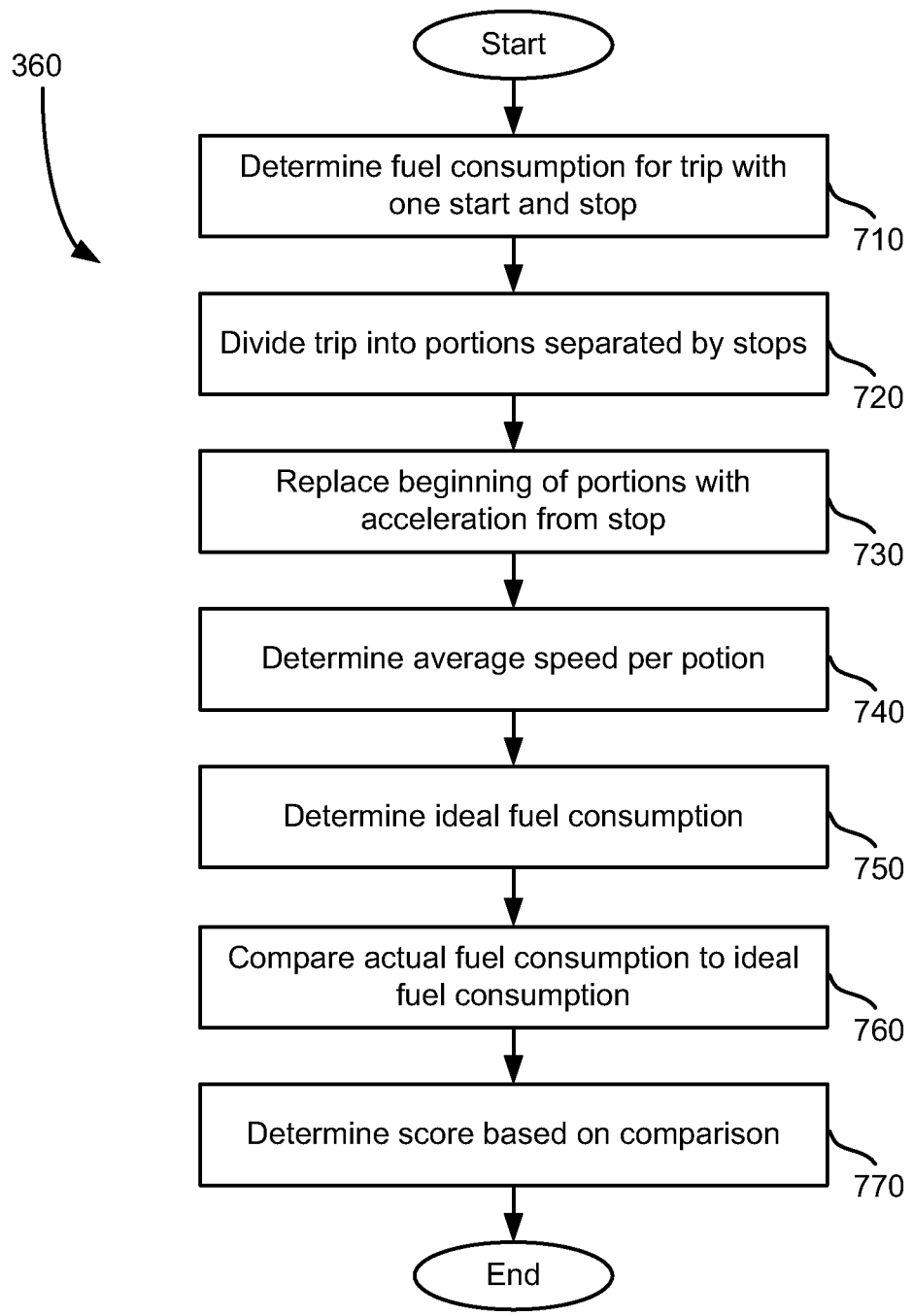
FIG. 7 is another exemplary method for providing driver rating data.

FIG. 7 is another exemplary method for providing a driver rating. First, fuel consumption is determined for a trip with one start and one stop. For example, for a trip from San Francisco to San Jose, the fuel consumption is determined for the trip assuming that the user leaves San Francisco and arrives at San Jose without making any stops and maintaining a constant speed.

The trip is divided into portions separated by stops at step 720. The stops may be determined based on traffic lights, off ramps, and other locations along the planned route at which a stop is likely. A beginning portion of each separate portion is replaced with an acceleration from a stop at step 730. The acceleration portion is intended to account for fuel consumption required to bring the vehicle up to speed after stopped at expected stopping points. The average speed proportion is then determined at step 740. The ideal fuel consumption is then determined for each portion based on the distance, expected average speed, and acceleration at step 750. The actual fuel consumption is compared to the ideal fuel consumption determined at step 750 at 760. A score is then based on a comparison and provided to a user at step 770.

Figure 8:
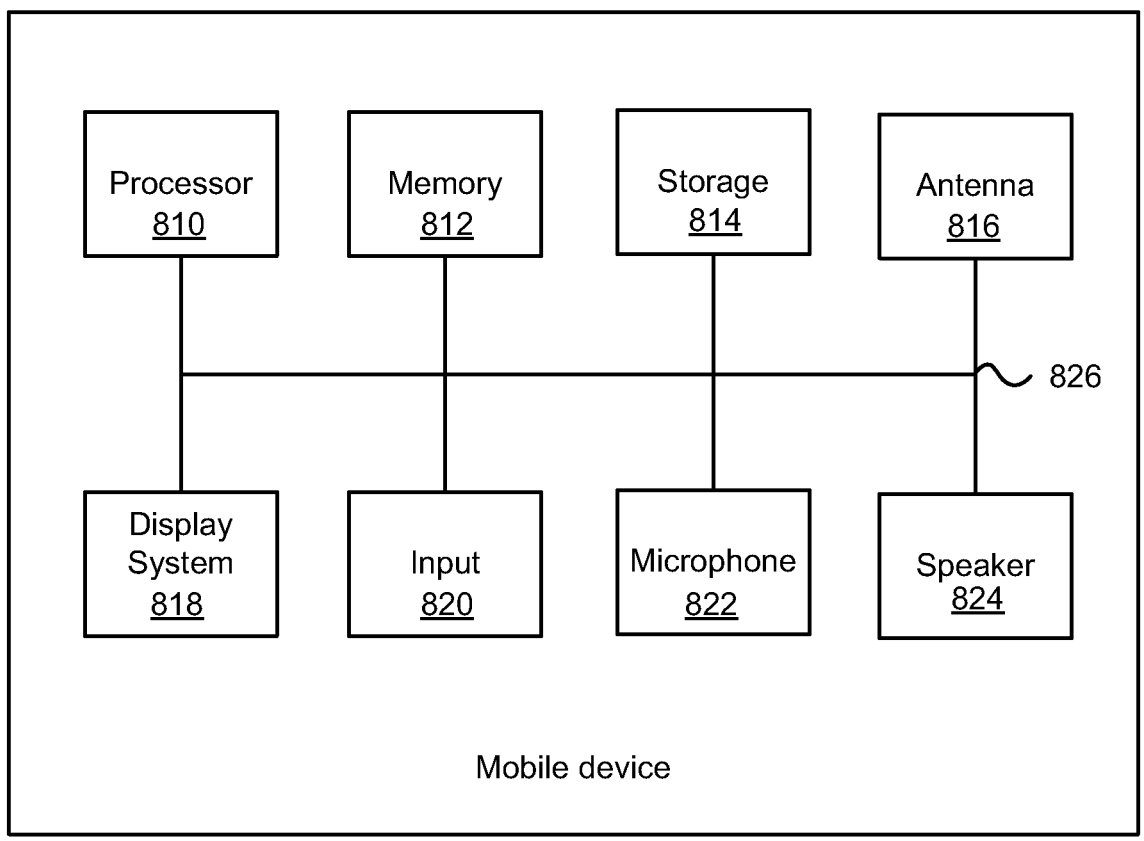
FIG. 8 is a block diagram of an exemplary mobile device.

FIG. 8 illustrates an exemplary mobile device system 800 that may be used to implement a mobile device for use with the present technology, such as for mobile devices 110, 130 and 140. The mobile device 800 of FIG. 8 includes one or more processors 810 and memory 812. Memory 812 stores, in part, programs, instructions and data for execution and processing by processor 810. The system 800 of FIG. 8 further includes storage 814, one or more antennas 816, a display system 818, inputs 820, one or more microphones 822, and one or more speakers 824.

The components shown in FIG. 8 are depicted as being connected via a single bus 826. However, the components 810-1024 may be connected through one or more data transport means. For example, processor unit 810 and main memory 812 may be connected via a local microprocessor bus, and storage 814, display system 818, input 820, and microphone 822 and speaker 824 may be connected via one or more input/output (I/O) buses.

Memory 812 may include local memory such as RAM and ROM, portable memory in the form of an insertable memory card or other attachment (e.g., via universal serial bus), a magnetic disk drive or an optical disk drive, a form of FLASH or PROM memory, or other electronic storage medium. Memory 812 can store the system software for implementing embodiments of the present invention for purposes of loading that software into main memory 810.

Antenna 816 may include one or more antennas for communicating wirelessly with another device. Antenna 816 may be used, for example, to communicate wirelessly via Wi-Fi, Bluetooth, with a cellular network, or with other wireless protocols and systems. The one or more antennas may be controlled by a processor 810, which may include a controller, to transmit and receive wireless signals. For example, processor 810 execute programs stored in memory 812 to control antenna 816 transmit a wireless signal to a cellular network and receive a wireless signal from a cellular network.

Display system 818 may include a liquid crystal display (LCD), a touch screen display, or other suitable display device. Display system 870 may be controlled to display textual and graphical information and output to text and graphics through a display device. When implemented with a touch screen display, the display system may receive input and transmit the input to processor 810 and memory 812.

Input devices 820 provide a portion of a user interface. Input devices 860 may include an alpha-numeric keypad, such as a keyboard, for inputting alpha-numeric and other information, buttons or switches, a trackball, stylus, or cursor direction keys.

Microphone 822 may include one or more microphone devices which transmit captured acoustic signals to processor 810 and memory 812. The acoustic signals may be processed to transmit over a network via antenna 816.

Speaker 824 may provide an audio output for mobile device 800. For example, a signal received at antenna 816 may be processed by a program stored in memory 812 and executed by processor 810. The output of the executed program may be provided to speaker 824 which provides audio. Additionally, processor 810 may generate an audio signal, for example an audible alert, and output the audible alert through speaker 824.

The mobile device system 800 as shown in FIG. 8 may include devices and components in addition to those illustrated in FIG. 8. For example, mobile device system 800 may include an additional network interface such as a universal serial bus (USB) port.

The components contained in the computer system 800 of FIG. 8 are those typically found in mobile device systems that may be suitable for use with embodiments of the present invention and are intended to represent a broad category of such mobile device components that are well known in the art. Thus, the computer system 800 of FIG. 8 can be a cellular phone, smart phone, hand held computing device, minicomputer, or any other computing device. The mobile device can also include different bus configurations, networked platforms, multi-processor platforms, etc. Various operating systems can be used including Unix, Linux, Windows, Macintosh OS, Google OS, Palm OS, and other suitable operating systems.

Figure 9:
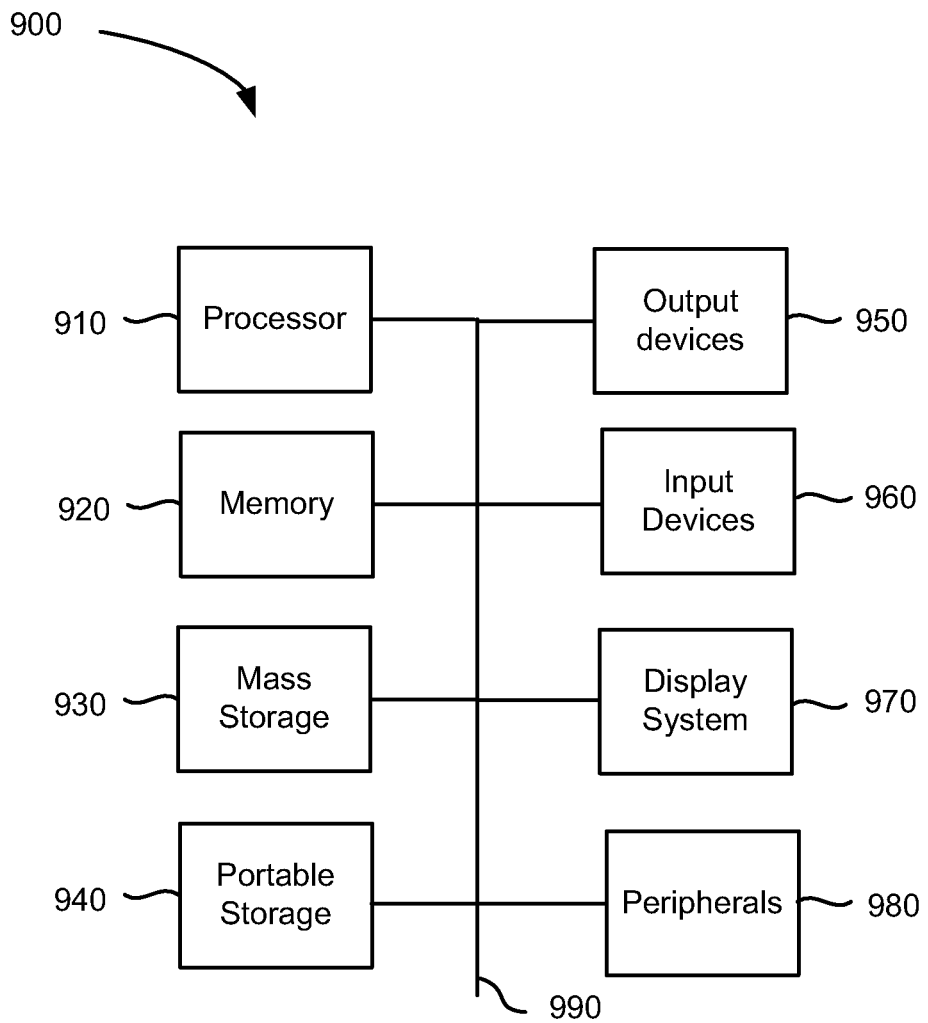
FIG. 9 is a block diagram of an exemplary computing device.

FIG. 9 illustrates an exemplary computing system 900 that may be used to implement a computing device for use with the present technology. System 900 of FIG. 9 may be implemented in the contexts of the likes of servers 150, 160 and 170 of FIG. 1. The computing system 900 of FIG. 9 includes one or more processors 910 and memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a floppy disk, compact disk or Digital video disc, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 950. Examples of suitable output devices include speakers, printers, network interfaces, and monitors.

Display system 970 may include a liquid crystal display (LCD) or other suitable display device. Display system 970 receives textual and graphical information, and processes the information for output to the display device.

Peripherals 980 may include any type of computer support device to add additional functionality to the computer system. For example, peripheral device(s) 980 may include a modem or a router.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for processing traffic data, comprising:
   receiving traffic data by a mobile device, the traffic data originating from multiple sources,
   wherein the traffic data is received at least in part from crowd sourced data, a portion of the crowd sourced data originating passively through a plurality of mobile devices and another portion of the crowd sourced data originating actively from a remote user through a plurality of mobile devices, and
   wherein the traffic data includes incident data, traffic flow data, and media data associated with the traffic;
   validating the traffic data by:
   aggregating the traffic data and
   removing anomalies in the traffic data;
   providing traffic information to a user through an interface of the mobile device according to user criteria,
   wherein the user criteria includes at least a user location and at least one type of traffic information the user is interested in receiving, and
   wherein the traffic information is generated based on the validated traffic data;
   providing driving efficiency information through the interface; and
   updating the traffic information at a frequency based on accuracy of the traffic information and battery performance of the mobile device.

2. The method of claim 1, wherein the driving efficiency information includes fuel consumption data.

3. The method of claim 2, wherein the fuel consumption data is based at least in part on vehicle specification information.

4. The method of claim 2, wherein the fuel consumption data is filtered.

5. The method of claim 1, wherein the driving efficiency information includes carbon footprint data.

6. The method of claim 1, wherein the driving efficiency information includes driver rating data.

7. A non-transitory computer readable storage medium having embodied thereon a program, the program being executable by a processor to perform a method for processing traffic data, the method comprising:
   receiving traffic data by a mobile device, the traffic data originating from multiple sources,
   wherein the traffic data is received at least in part from crowd sourced data, a portion of the crowd sourced data originating passively through a plurality of mobile devices and another portion of the crowd sourced data originating actively from a remote user through a plurality of mobile devices, and
   wherein the traffic data includes incident data, traffic flow data, and media data associated with the traffic;
   validating the traffic data by:
   aggregating the traffic data and
   removing anomalies in the traffic data;
   providing traffic information to a user through an interface of the mobile device according to user criteria,
   wherein the user criteria includes at least a user location and at least one type of traffic information the user is interested in receiving, and wherein the traffic information is generated based on the validated traffic data;
providing driving efficiency information through the interface; and
updating the traffic information at a frequency based on accuracy of the traffic information and battery performance of the mobile device.

8. The non-transitory computer readable storage medium of claim 7, wherein the driving efficiency information includes fuel consumption data.

9. The non-transitory computer readable storage medium of claim 8, wherein the fuel consumption data is based at least in part on vehicle specification information.

10. The non-transitory computer readable storage medium of claim 8, wherein the fuel consumption data is filtered.

11. The non-transitory computer readable storage medium of claim 7, wherein the driving efficiency information includes carbon footprint data.

12. The non-transitory computer readable storage medium of claim 7, wherein the driving efficiency information includes driver rating data.

* * * * *